United States Patent [19]

Ryder

[11] Patent Number: 4,472,131

[45] Date of Patent: Sep. 18, 1984

[54] APPARATUS FOR INJECTION MOLDING OF PLASTIC PREFORM

[76] Inventor: Leonard B. Ryder, 5 Sharon Dr., Whippany, N.J. 07981

[21] Appl. No.: 483,711

[22] Filed: Apr. 11, 1983

[51] Int. Cl.³ .................. B29F 1/00; B29D 23/02
[52] U.S. Cl. ............................ 425/548; 264/28; 264/237; 264/328.14; 264/328.16; 425/547; 425/552
[58] Field of Search ............. 425/526, 533, 547, 548, 425/552; 264/28, 237, 328.14, 328.16, 537, 538

[56] References Cited

U.S. PATENT DOCUMENTS

| | | | |
|---|---|---|---|
| 3,785,116 | 1/1974 | Munz et al. | 425/533 X |
| 3,819,314 | 6/1974 | Marcus | 425/526 |
| 3,998,577 | 12/1976 | Farrell | 425/535 X |
| 4,065,246 | 12/1977 | Marcus | 425/533 X |
| 4,201,535 | 5/1980 | Ninneman | 425/547 X |
| 4,205,950 | 6/1980 | Suss et al. | 425/552 X |
| 4,209,290 | 6/1980 | Rees et al. | 425/547 |
| 4,285,657 | 8/1981 | Ryder | 425/526 X |

FOREIGN PATENT DOCUMENTS

1176149  1/1970  United Kingdom ............... 264/537

Primary Examiner—Jan Silbaugh
Attorney, Agent, or Firm—Edward M. Fink

[57] ABSTRACT

A method for the fabrication of a plastic preform suitable for use in the preparation of biaxially oriented hollow articles is described wherein the duration of the preform injection molding cycle is reduced, thereby enhancing the productivity of the injection molding step. This end is attained by injection molding and cooling, and supercooling and conditioning simultaneously at a single station of an injection molding machine at different positions within the station.

1 Claim, 6 Drawing Figures

APPARATUS FOR INJECTION MOLDING OF PLASTIC PREFORM

BACKGROUND OF THE INVENTION

This invention relates to a method for injection molding of plastic preforms and to the apparatus employed therefor. More particularly, the present invention relates to a method for rapidly preparing plastic preforms suitable for use in the preparation of molecular biaxially oriented hollow articles from thermoplastic materials.

DESCRIPTION OF THE PRIOR ART

Among the more popular of the commercially available preforms are those injection molded from polyethylene terephthalate, such preforms being used to produce the biaxially oriented "PET" plastic container commonly associated with carbonated soft drinks.

Heretofore, the vast majority of the biaxially oriented "PET" carbonated soft drink bottles have been produced by the two step "reheat-blow" method, a different apparatus being employed in each step. The processing sequence employed in this operation includes a first step in which an injection molding machine is used to mold "PET" preforms which are subsequently cooled and removed from the molding machine. The preform so obtained serves as the feedstock in a second processing step in which a reheat-blow machine is employed. In this step, the preform is stretch-blow molded into an oriented container. Thus, the plastic preform is the intermediate product in the process of converting raw thermoplastic polyethylene terephthalate into a molecular biaxially oriented hollow article suitable for use as a bottle or container.

In the operation of a typical commercial procedure for manufacturing an oriented beverage bottle, such as the 2-liter "PET" bottle, preforms are injection molded at the rate of 8 or 16 per cycle, the polyethylene terephthalate being injected into the molding machine at melt temperatures of the order of 540° F. over temperature controlled cool core rods contained within cooled injection molds, 8 or 16 preform injection mold cavities being filled simultaneously. Cooling of the core rod and injection mold are effected by continuous circulation of a cooling fluid, typically maintained at a temperature ranging from 35°–40° F. through cooling conduits in the core rod and injection mold. In this manner, the plastic material contained within the mold is solidified and cooled by the coolant which circulates through the core rod and preform mold, thereby extracting heat from the plastic. After cooling the preform to a suitable ejection temperature, the mold opens and the preforms are ejected and removed for subsequent processing, the injection molding cycle then being repeated. It is of interest to note that in the injection molding operation, injection and cooling of the preforms are effected sequentially in the same mold, on the same core rod and at the same position within the molding machine.

In evaluating the merits of the described injection molding process, it should be noted that the process is cooling limited in that the rate of preform production is essentially controlled by the time period required to achieve sufficient preform cooling. Cooling must be continued to assure that the preforms will not stick to each other, scratch or become marred upon handling following ejection from the molding machine. At present, cycle times for injection molding of 2-liter "PET" soft drink bottle preforms, as described above, range from 28–30 seconds. The major portion of that cycle time is devoted to achieving sufficient cooling prior to ejection from the molding machine.

Although this technique is widely used in industry, several disadvantages are inherent therein. Thus, for example, the molding machines and tooling costs normally associated with injection mold and core rod fabrication are oftimes exhorbitant. This is in large measure attributed to the requirement for close tolerance in fabrication of core rods, precision finishing and polishing of the inner surfaces of the molds and the chrome plating of mold surfaces. Perhaps the most significant limitation in this process resides in the 28–30 second injection mold cycle time which exceeds by 5 times the time required (6 seconds) to convert a preform into a finished oriented container in the second step of the manufacturing process in the reheat-blow apparatus. Thus, an injection molding machine, even when molding 16 preforms per cycle at 100 percent efficiency cannot furnish an adequate supply of preforms to keep abreast of the output of a single reheat-blow machine which stretch-blow molds 4 preforms every 6 seconds. Consequently, a single reheat-blow machine can only be adequately supplied with the requisite number of preforms by more than one injection molding machine, thereby increasing the costs of the machinery two fold.

Thus, an object of the present invention was to develop a method for reducing the time period of the preform injection molding cycle, thereby enhancing the productivity of the injection molding step in the manufacture of plastic containers and eliminating the necessity for the use of more than one injection molding machine to supply preform feedstock to a single reheat-blow machinery. Heretofore, no commercially viable method for matching the productivity output of a single injection molding machine with that of a single reheat-blow machine has been reported in the literature.

In accordance with the present invention, the prior art limitations delineated hereinabove and the foregoing object are effectively obviated and attained, respectively by a novel procedure effected at high speeds with an in-line single station injection molding apparatus. In this apparatus, injection molding and cooling, and super cooling and conditioning of preforms are effected simultaneously at a single station of an injection molding machine at different positions within the station. A brief description of process follows.

Initially, hot thermoplastic material is injected over a cool temperature controlled core rod disposed within a cooled preform mold, and cooling of the preform effected rapidly in the mold to a temperature sufficient to permit removal of the preform from the mold, while still on the core rod, without sticking to the mold or distorting dimensionally. At this juncture, due to the rapid cooling by the mold and core rod, the inner and outer surfaces of the preform are cooler than the hot inner core of the preform walls. Next, the core rod, having disposed thereon a partially cooled preform, is shifted to a final super cooling conditioning position in which a super cooling mold closes over the preform. Super cooling of the preform is then effected either by contact with the cold inner surface of a second set of preform molds, or preferably by passing cold air through the air gap formed between the outer surface of the preform and the inner surface of an over-sized preform mold. Supercooling is continued until the hot central core of the parison has been cooled to a temperature such that its residual heat will not cause excessive reheating of the outer surfaces of the preform wall after it is ejected from the mold. This excessive reheating, if not controlled, would typically result in the formation of hot soft outer preform surfaces which would be prone to sticking, scratching, and marring upon contact with each other in subsequent handling after being ejected from the molding machine.

As noted previously, the rate at which preforms can be fabricated by injection molding techniques is a function of the time required to effect adequate cooling of the preform. In accordance with the invention, the cooling time is significantly reduced as compared to the known commercial techniques wherein injection and cooling are conducted sequentially in the same mold and on the same core rod located at the same position of an injection molding machine. In the instant case, this end is achieved (reduction of cooling time) and production rates increased by injecting, forming and partial cooling in one position of an injection molding machine while simultaneously cooling and supercooling in a second position within the same injection molding machine. Supercooling is preferably effected by introducing cold compressed air, with or without entrained moisture at one end of an oversized preform supercooling mold at a point corresponding with the tip of the plastic preform. The cold air passes through the air gap formed by the preform outer surfaces and the oversized inner surfaces of the supercooling mold, first impinging on the tip of the preform and then passing over the outer side walls of the preform and, finally, escaping through vent holes located at the outer end of the supercooling preform mold at an axial position corresponding with the preform neck ring or thread finish.

The described process now makes available dramatic machinery and tooling cost reductions. Thus, for example, in the fabrication of 2-liter "PET" plastic beverage bottles only one injection molding machine is required to supply preform feedstock to a single "reheat-blow" machine, an end result not attainable by workers in the art heretofore.

The invention will be more fully understood by reference to the following detailed description taken in conjunction with the accompanying drawing wherein:

Figure 1:
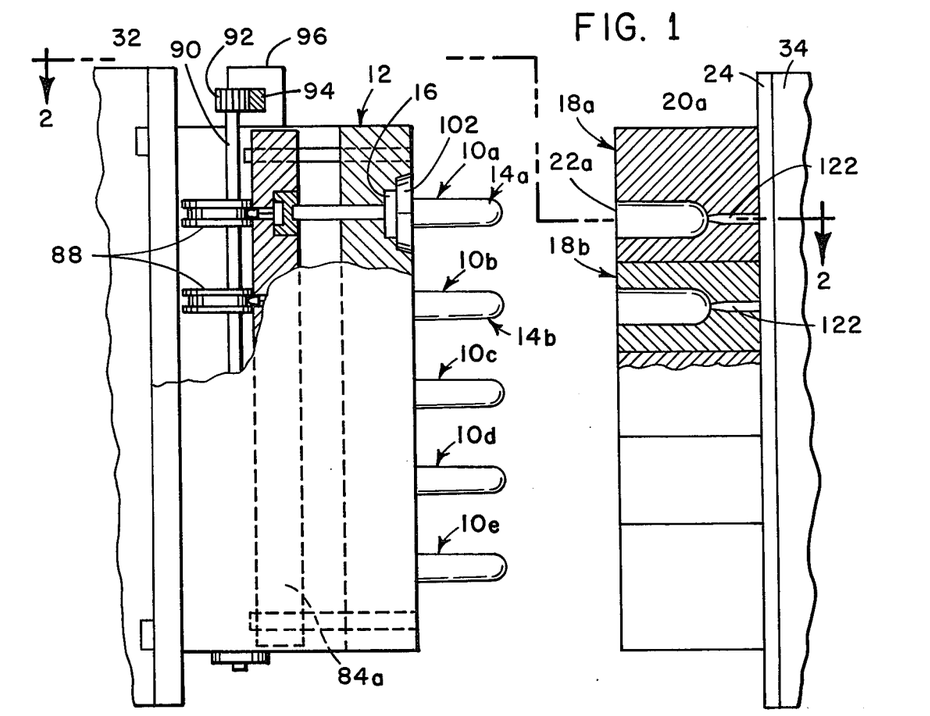
FIG. 1 is a fragmentary elevational view, partly in section, of an apparatus suitable for use in the practice of the invention.
Figure 2:
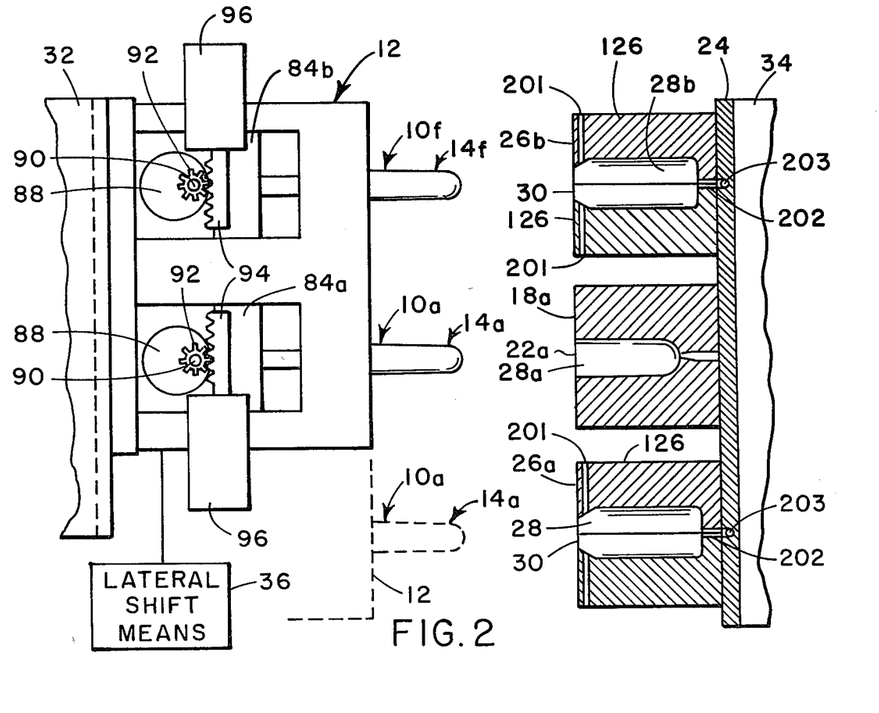
FIG. 2 is a view taken along line 2—2 in FIG. 1.

With reference now to the drawing, FIGS. 1 and 2 show typical apparatus used in the practice of the invention. Shown are ten assemblies which are mounted on a core plate 12 in two vertical rows of five assemblies each. Each core assembly 10 includes a core rod 14 and a sleeve 16. The sleeve 16 of each core assembly 10 is fixedly mounted to the core plate 12. The core rod 14 of each core assembly 10 is slidably received in the sleeve 16 of that assembly so that each core rod 14 protrudes from the core plate 12.

Five injection molds 18 are included, which define respective preform cavities 20, each of which, in turn has an open mouth 22, and are mounted to a mold plate 24 so that their cavity mouths 22 face toward the core plate 12. The injection molds 18 are mounted in a vertical row between adjacent vertical rows of supercooling molds 26. There are five injection molds 18 per vertical row. In FIG. 1, the vertical distance between the centerlines of the cavity mouths 22 in injection mold 18a and 18b is equal to the vertical distance between the centerlines of core rods 14a and 14b. The vertical distance between centerlines is the same between each injection mold 18 and each core rod 14 in their respective vertical rows.

Ten supercooling molds 26 are included, although only two of these are visible in FIG. 2. Each of these supercooling molds defines a supercooling mold cavity 28 having an open mouth 30. The supercooling molds are mounted to the mold plate 24 in two vertical rows of five molds per row. The vertical distances between adjacent supercooling molds, measured between the centerlines of the cavity mouths 30, are equal to the vertical distances, measured between the core rod 14 centerlines, between adjacent core rods in a common vertical row of core assemblies 10. The vertical rows of supercooling molds are alternately mounted on the mold plate 24 with the vertical rows of injection molds 18. The horizontal spacing between adjacent vertical rows of molds, measured between the centerlines of adjacent mold cavities, is equal to the horizontal spacing between adjacent vertical rows of core assemblies, measured between the centerline of horizontally adjacent core rods 14.

The core plate 12 is slidably mounted to one platen 32 of a press, and the mold plate 24 is fixedly mounted to the opposing platen 34 of the press. The press is arranged to move the platens 32 and 34 towards and away from one another, and thereby move the core plate and mold plate towards and away from one another. Any type of press may be utilized, but the hydraulic and toggle types of presses commonly used in the injection molding art are preferred.

As shown in solid lines in FIG. 2, the core plate 12 is in its first lateral position, so that a first vertical row of core assemblies, which includes core assembly 10a, is aligned with the vertical row of injection molds which includes injection mold 18a, and the second vertical row of core assemblies, which includes core assembly 10f, is aligned with the vertical row of supercooling molds which include supercooling mold 26b. Thus, when the press moves the core plate 12 towards the mold plate 24, core rod 14a of core assembly 10a will enter into the cavity 20a of injection mold 18a, core rod 14b will enter into the cavity of injection mold 18b, and the core rods 14 of the other assemblies in that vertical row will enter into the cavities of the other injection molds. At the same time, core rod 14f of core assembly 10f will enter into the cavity 28b of supercooling mold 26b, and the core rods of the core assemblies which are in the same vertical row as core assembly 10f will enter into the cavities of the corresponding supercolling molds.

In FIG. 2 the lateral shift means 36 is operatively associated with the core plate 12 to shift the core plate 12 laterally of the press and mold plate 24, into a second lateral position indicated in broken lines in FIG. 2 while the press is open and the core rods are remote from the injection and supercooling molds. The lateral distance traversed by the core plate in the course of each such shift is equal to the horizontal spacing between adjacent vertical rows of core assemblies, measured between the centerlines of horizontally adjacent core rods. Thus, when the core plate is in the second lateral position, the first vertical row of core assemblies, including core assembly 10a, will be aligned with the vertical row of supercooling molds which includes supercooling mold 26a, and the second row of core assemblies, which includes core assembly 10f, will be aligned with the row of injection molds, including injection mold 18a.

The lateral shift means 36 is synchronized with the press, and is arranged to move the core plate 12 each time the press opens. Thus, the core plate 12 will be in its second lateral position during the intervening press cycles. Thus, the core plate 12, mold plate 24, press, lateral shift means 36, which together constitute the support and transport means of the preferred embodiment, will engage each core assembly 10 alternately with one of the injection molds 19 and with one of the supercooling molds 26. The lateral shift means 36 may include a pneumatic or hydraulic cylinder and appropriate control valves (not shown).

As set forth above, each one of the core rod assemblies 10 includes a sleeve 16 which is fixedly mounted to the core plate 12 and a core rod 14 which is slidably received in the sleeve 16. As shown in detail in FIG. 3, each core rod 14 has a circumferentially extending conical seal surface 38, and each sleeve 16 has a matching circumferentially extensive conical seal surface 40. Each core rod 14 includes a parison contact portion 42 which extends outwardly from the seal surface 38 of the core rod to the apex and tip of the rod where a tip opening 70 is formed which acts as a seat for air plug 76. Each core rod includes an actuator portion 46 extending inwardly, through the bore 48 of the associated sleeve 16 to the core rod control plate 84.

Figure 6:
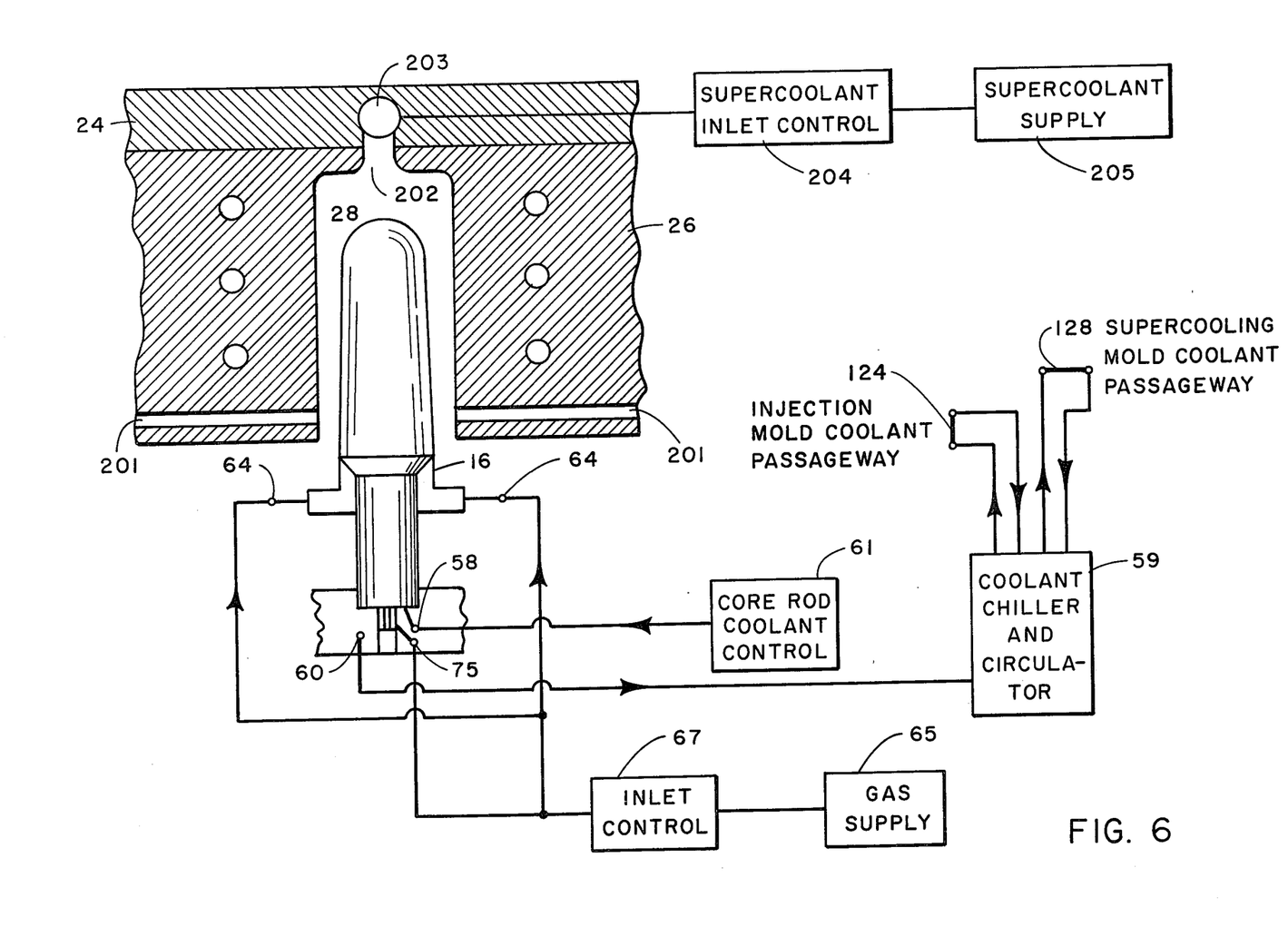
FIG. 6 is a schematic view depicting the fluid circuitry associated with a core rod assembly, an injection mold and a supercooling mold.

Each core rod interior is formed from a cylindrical cooling bore 50 extending coaxially with the core rod 14. A cylindrical flow director slug 52 having interlaced helical grooves on its surface is positioned within the cooling bore 50 so that a slug 52 and the wall of the cooling bore 50 cooperatively define a pair of interlaced helical channels 54 and 56 which do not communicate with one another along the length of the slug 52. The slug 52 and the cylindrical cooling bore 50 wall of the core rod 14 cooperatively define a circular cross passage 57 which interconnects the helical channels 54 and 56 at the parison contact tip of the cooling bore. One of the channels is connected to a cooling fluid inlet passageway 58, and the other one of the helical channels is connected to a cooling fluid outlet passageway 60. As shown in FIG. 6, coolant is supplied via chiller and circulator 59 through a core rod coolant control valve 61 to the cooling fluid inlet passageway 58. The coolant is conducted up the core rod 14 through one of the helical channels 54, and then across cross passage 57 and back down the core rod through the other channel 56, to the cooling fluid outlet passageway 60. The coolant is then recycled back to the coolant chiller and circulator 59. The interlaced pattern of these channels assures that the cooling fluid will exert a uniform cooling effect throughout the entire length of the parison contact portion 42 of the core rod 14.

A tip opening 70 is at eh parison contact end of each core rod. An ejection air passageway 72 extends through the length of the core rod from the tip opening 70 down to the spring chamber 100a, through passageway 75a and bore 75, which are formed in the core rod control plate 84, and to gas inlet control 67 in FIG. 6. The ejection air passageway is isolated from the chiller coolant cross passage 57 in FIG. 3 at the tip of the parison contact end of the cooling bore 50 in the core rod by an O-ring 74. An air plug 76 is affixed to a stem 78, which extends through the entire length of the core rod in the ejection air passageway 72, and ends in an enlarged head 82.

The actuator end 80 of each core rod is affixed to an associated core rod control plate 84, which in turn is slidably mounted within the core plate 12 for advancing the core rods in an outward direction towards the mold plate 24. Each such control plate 84 is biased away from the sleeve 16 in FIG. 3 by compression springs 86 which bear upon the sleeve 16 and on the core rod control plate 84. Preferably, the core rods of each vertical row of core assemblies are affixed to a common core rod control plate 84. Thus, as shown in FIG. 1, all of the core rods 14a through 14e of the core assemblies are affixed to a first core rod control plate 84a, while the core rods of the second vertical row of core assemblies are affixed to a separate core rod control plate 84b in FIG. 2.

Thus, the springs 86 and the core rod control plates 84a and 84b will serve as core rod retractor means, and will retain each core rod in its fully retracted position except when the associated core rod control plate 84 are fixedly mounted on shafts 90 which are rotatably mounted to the core plate by bearings (not shown) and which are connected to pinions 92 in FIGS. 1 and 2. The pinions 92 are each connected by racks 94 to respective pneumatic cylinders 96. Thus, the pneumatic cylinder 96 can operate the cams 88 associated with each core rod control plate 84 and force that core rod control plate 94, and the core rods associated therewith, towards the mold plate 24. Each of the cams 88 has a series of slots 98 formed on its periphery. Each one of these slots is arranged to receive the head 82 of the stem 78 in FIG. 3. of the associated core rod assembly. When injection molding and supercolling preforms, the core rods always remain stationary.

Figure 5:
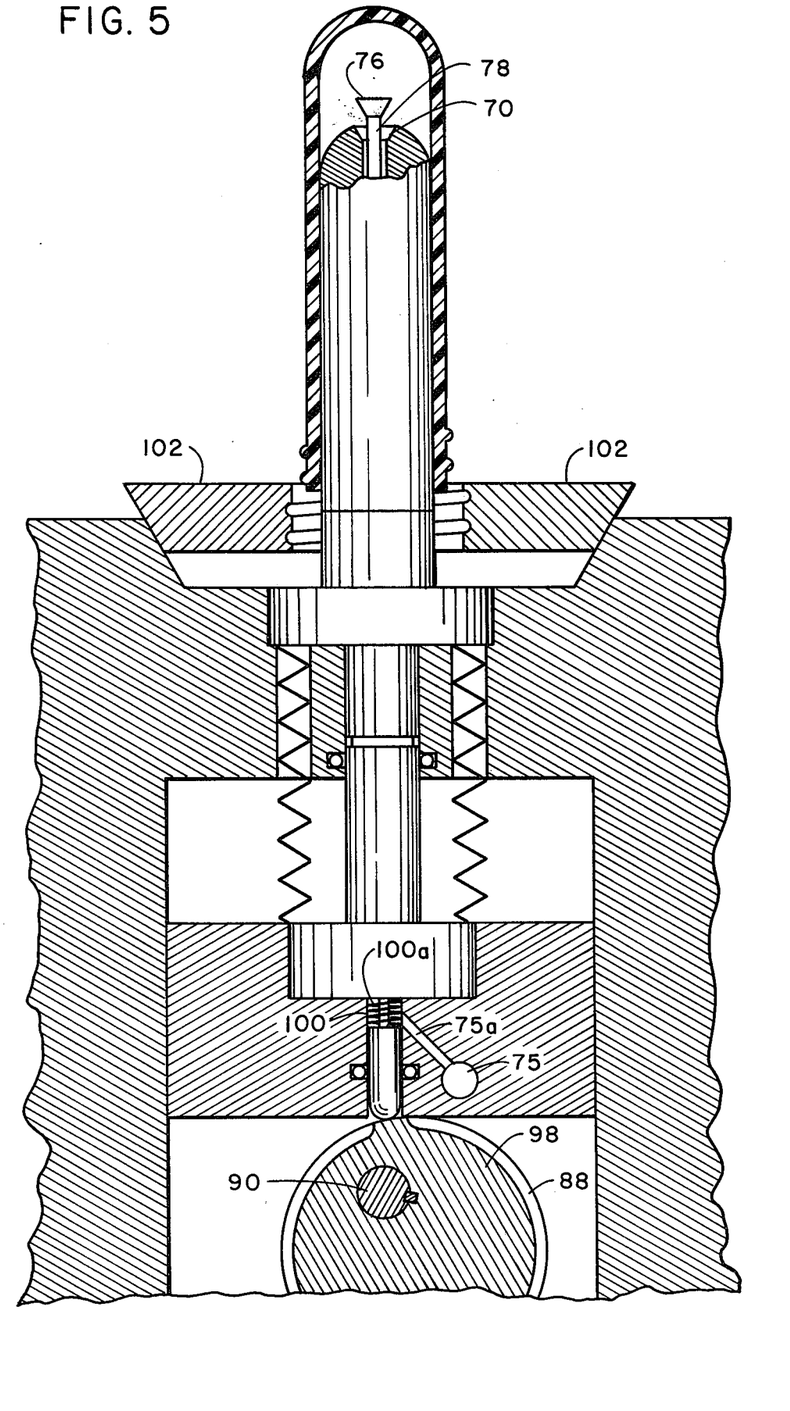
FIG. 5 is a front elevational view in section of a core rod of the type shown in FIG. 4 having a preform disposed therein, and ejection apparatus used in the ejection stage of the process.

A spring 100 bears on each stem head 82 to urge it into the slots 98 of the associated cam 88. When one of the cams 88 is in a position such as that depicted in FIG. 3, wherein the slots 98 is aligned with the associated stem head 82, then the air plug 76 of the associated stem head 82, then the air plug 76 of the associated core rod assembly will be in its closed position. When the cam 88 is rotated to a position such as that depicted in FIG. 5, wherein no slot is aligned with the stem head 82, then the associated air plug 76 will be moved to its open position. In this manner the cams serve as part of the means for opening and closing the air plug 76.

Pairs of neck ring halves 102 are mounted to the core plate 12 so that each pair of neck ring halves 102 surrounds the sleeve 16 of an associated core rod assembly. Each pair of neck ring halves is movably mounted to the core plate 12 by conventional neck ring actuating means (not shown) so that the neck ring halves 102 may be moved outwardly away from each other, and outwardly from the core plate 12 when the core plate is moved away from the molds by the press. However, when the core plate 12 is advanced toward the molds and the core rods 14 are engaged with the molds as in FIG. 4, a surface 104 of each neck ring half cooperates with a surface 106 on the core plate 12 to force by means of wedging action that neck ring half against the mating neck ring half and sealingly engage each pair of neck ring halves with one another along a parting line between them. Also, whenever the core plate 12 is advanced toward the molds and the core rod assemblies are engaged with the molds, the mold-facing surface 108 of each neck ring half sealingly engages a parting line surface 110 of the adjacent mold. Simultaneously, a sleeve facing surface 112 of each neck ring half engages a mating surface 114 of the associated sleeve. In this fashion the neck ring halves serve to seal the sleeve of each core rod assembly within the core plate 12 and away from the mold with which such core rod assembly is engaged.

Figure 4:
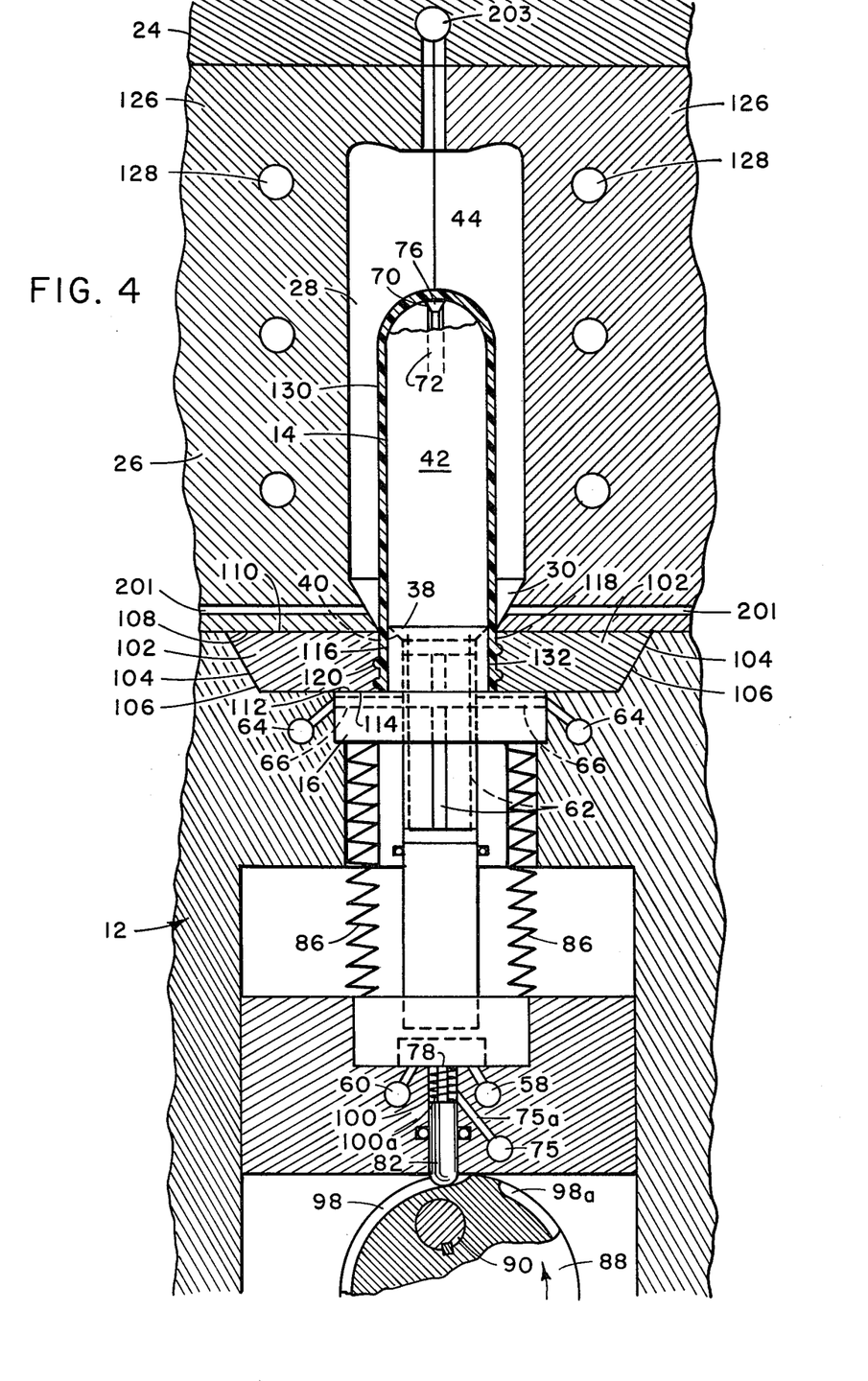
FIG. 4 is a view of the core assembly shown in FIG. 3 showing it in engagement with a supercooling mold.

Each of the neck ring halves 102 in FIG. 4 includes a hemicylindrical surface 116. When the neck ring halves are engaged with one another, and the associated core rod assembly is engaged with one of the mold cavities, these surfaces 116 define a space 118 surrounding the outer portion of the sleeve 16. Each such space forms a neck extension of the adjacent mold cavity.

Figure 3:
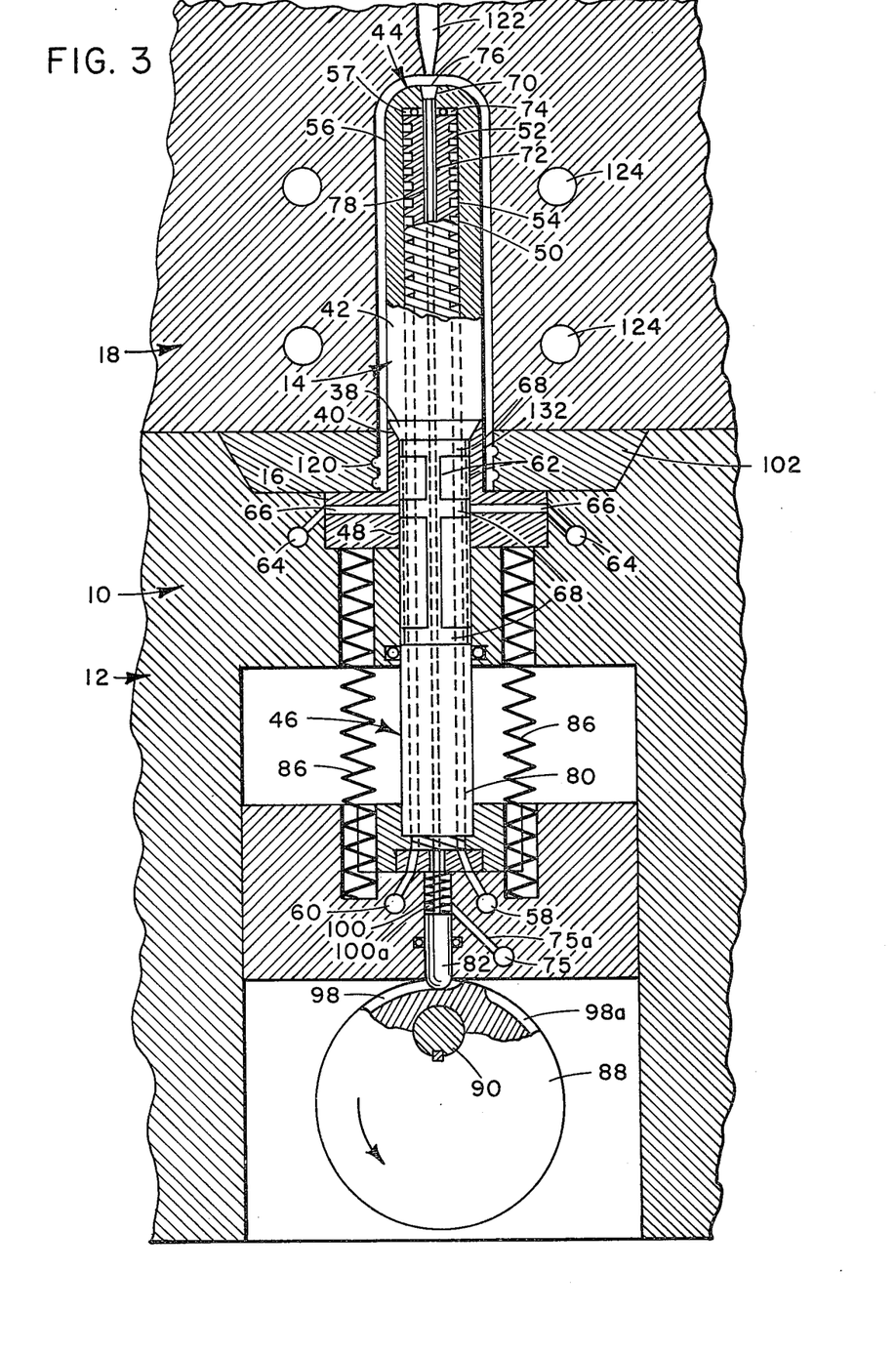
FIG. 3 is a fragmentary sectional view of the apparatus depicted in FIG. 1 and 2 showing a core assembly in engagement with an injection mold.

Although the cooperation of the neck ring halves with the molds and the sleeves of the core rod assemblies has been described above with reference to the supercooling, the neck ring halves function in the same fashion with the injection molds as shown in FIG. 3. Thus, the neck rings define a neck extension of the cavity of each mold, regardless of whether the core rod assembly is engaged with an injection mold or a supercooling mold. The hemicylindrical surface 116 of each neck ring half is provided with grooves 120. These grooves are arranged so that, when a pair of neck ring halves are engaged with one another the grooves 120 cooperatively define a continuous helical channel or thread along the surface 116 of such neck ring halves.

Each injection mold 18 in FIGS. 1, 2 and 3 is provided with a sprue 122 which communicates with the cavity 20 of the mold. These sprues are in communication with an injection barrel and screw assembly (not shown) by way of a conventional runner system (not shown). The thermoplastic to be processed can be brought to a molten state within the injection barrel and forced under pressure through the runner system to the sprues 122. Thus, the sprues 122 serve as part of a system for injecting molten thermoplastic into the injection molds. Also, each of the injection molds is provided with coolant passages 124 in FIG. 3. These coolant passages are connected to the coolant chiller and circulator 59 in FIG. 6 so that the circulator can force coolant through the passageways and maintain the mold at the desired temperature.

Each of the supercooling molds 26 in FIGS. 2 and 4 includes a pair of separable mold halves 126 which are slidably mounted to the mold plate in FIG. 2. Conventional blow mold opening and closing apparatus (not shown) is provided for moving the blow mold halves 126 by wedging action into sealing engagement with one another and maintaining them in such engagement with one another and maintaining them in such engagement while the press is closed and the core assemblies are engaged within the molds. The supercooling mold opening and closing apparatus is also arranged to separate the halves of each supercooling mold 126 from one another at the appropriate time to allow the preform being cooled in the supercooling mold cavity 28 in FIG. 2 to be rejected from the apparatus. Each of the supercooling mold halves 126 has coolant channels 128 in FIG. 4 formed in it. These channels are connected to the coolant chiller and circulator 59 in FIG. 6 so that the circulator can force coolant through the channels 128 to maintain the mold halves at the desired temperature.

Each of the supercooling molds 26 in FIG. 4 includes supercoolant inlet passageways 202 which extend from the supercooling mold cavity into the mold plate 24, and into the coolant entrance bore 203 in the mold plate. In addition each of the supercooling molds 26 in FIG. 4 includes coolant vent passageways 201. Supercoolant may be introduced into the supercooling mold cavities 28 in FIG. 6, via the supercoolant supply 205, supercoolant inlet control 204, supercoolant entrance bore 203, and coolant inlet passageways 202. Supercoolant may be exhausted from the supercoolant mold cavities 28 via coolant vent passageways 201 in FIG. 6.

OPERATION OF THE PREFERRED EMBODIMENT

The operation of the apparatus will now be described with reference to a single one of the core assemblies. The molding cycle begins when the press brings the platen 32 and 34 in FIG. 1 to the closed position thus engaging the core assembly with an injection mold as shown in FIG. 3. The core rod 14 is held in its fully retracted position by the springs 86 and control plate 84, so that the seal surface 38 of the core rod is sealingly engaged with the seal surface 40 of the associated sleeve 16. The neck ring halves 102 are engaged with one another, and form the neck extension of the mold cavity, which is a concentric space around the sleeve 16.

While the apparatus is in this position, the thermoplastic to be processed by the apparatus is injected into the cavity of the injection mold, via the conventional runner system and sprues 122, in a molten condition under substantial pressure. The thermoplastic thus injected will also flow into the neck extension of the cavity which is defined by the neck ring halves 102 and the sleeve 16.

The parts of the apparatus are maintained in this position after injection while the injected thermoplastic is cooled by heat transfer to the parison contact portion 42 of the core rod, the sleeve 16, the neck ring halves 102, and the mold 18. During this cooling step of the process, the surface of the parison contact portion of the core rod and the cavity surface of the mold are maintained at low temperatures relative to the thermoplastic material being processed by the coolant chiller and circulator 59 in FIG. 6, which circulates chilled coolant, conventionally at or near 35° F., through the helical coolant passageways 54 and 56 in the core rod and through the coolant passageways 124 in the injection mold 18.

In the cooling step described above, the parison is held within the injection mold until it becomes rigid as a preform and will not stick to the core rod or mold surfaces, drool, scratch, or otherwise deform in any manner, when it is laterally transferred on the same core rod to a supercooling mold, in a subsequent operation. At this time, the center portions of the preform walls, remote from the cold core rod and mold cavity surfaces, will be at temperatures substantially above the surface temperatures of the preform walls.

As a result of this temperature gradient across the thickness of the preform walls, it is necessary to to laterally transfer the preform to a supercooling position within the same injection molding machine, and supercool the preform by directing a continuous stream of coolant across the outer surfaces of the preform, while the inner surfaces of the preform continue to be cooled by the coolant circulating in coolant channels within the core rod. The preform is supercooled until such time that the hot center core of the preform has been cause excessive reheating of the outer preform walls after being ejected from the supercooling molds. Such excessive reheating would otherwise result in hot, soft, outer preform surfaces, which would be prone to sticking, scratching, and marring upon contact with each other in subsequent handling. The preform supercooling step is carried out in the supercooling molds.

In order to transfer the preform to the supercooling mold from the injection mold, the press moves platens 32 and 34 in FIG. 1 away from each other, carrying core plate 12 away from the mold plate 24 and disengaging the core assembly from the injection mold 18. The preform is retained on the same core assembly by frictional engagement of the preform with the parison contact portion 42 of the core rod and with the sleeve 16. Such frictional engagement is quite strong, because the parison has undergone shrinkage during the partial cooling within the injection mold described above. The retention of the preform on the core assembly is further assured by the engagement of the grooves 120 on the neck ring halves 102 with the thread on the neck portion of the preform.

The lateral shift means 36 in FIG. 2 then slides the core plate laterally of the mold plate to align the core rod and preform with one of the supercooling molds 26. The press then closes and the platens 32 and 34 in FIG. 1 and advances the core plate 12 towards the mold plate 24 so that the core assembly and preform are carried into engagement with the supercooling mold 26, and the supercooling of the preform begins.

Supercoolant is introduced into the supercooling mold cavity 28 in FIG. 2 via the supercoolant supply 205 in FIG. 6, the supercoolant inlet control 204, the coolant engrance bore 203, and the coolant inlet passageway 202, and continuously streams across the outer surfaces of the preform. The supercoolant passes through the air gap formed by the outer preform surfaces and the inner surfaces of the oversized supercooling mold, first by impinging on the tip of the preform, then passing over the outer side walls of the preform, and finally escaping through the coolant vent passageways 201 in FIG. 6, which are located at the other end of the supercoolant preform mold, at an axial position corresponding to the neck ring or thread finish.

After the preform has been supercooled to a suitable ejection temperature the mold platens 32 and 34 in FIG. 1 open, the supercooling mold halves are separated from one another by conventional means, and the core plate 12 in FIG. 2 is retracted away from the mold plate 24. The sleeve 16 and the neck ring halves 102 in FIG. 4 grip the neck portion of the preform, so that the preform is retracted out of the supercooling mold as the core plate is retracted. The neck ring halves are then separated from one another by conventional means and the preform is mechanically pushed and blown off the core rod. To deliver a push assist during the preform ejection step the cam 88, which is mounted to the shaft 90 in FIG. 4, is rotated by the action of pneumatic cylinder 96 advancing a rack 94 and rotating the pinion 92 in FIGS. 1 and 2, which is connected to said cam shaft 90, such that the slots 98 associated with said cam are moved out of alignment with the stem head 82 in FIG. 5 and the associated stem 78 and air plug 76 are moved outward in an axial direction toward the opposing mold plate 24 in FIG. 2, and the preform is partially pushed off the core rod. Simultaneously, a blast of compressed air is delivered to completely remove the preform from the core rod. The compressed air necessary to eject the preform is delivered by actuating the gas inlet control 67 in FIG. 6, such that compressed air flows through the bore 75, passageway 75a, spring chamber 100a, and ejection air passageway 72 in FIG. 5, and out through the tip opening 70 to assist in ejecting the preform. The ejected preform falls freely out of the apparatus into conventional conveying and receiving mechanisms for further processing.

To repeat the cycle, the cam 99 is rotated back to its initial position, so that the stem head 82 is moved into alignment with the slots 98 in FIG. 4, such that the spring 100 may force the air plug 76 back to its closed position. The lateral shift means 36 in FIG. 2 moves the core plate 12 laterally of the mold plate 24, back to its original position so that the core assembly is realigned with an injection mold, and the press closes to reengage the core assembly with an injection mold.

Although the operation of the apparatus has been described with reference to a single one of the core assemblies, it will be understood that the apparatus of the present invention utilizes a plurality of core assemblies, and that the support and transport means is arranged so that at least one of the core assemblies is engaged with an injection mold, while at least one other core assembly is engaged with a supercooling mold. Therefore, while some of the core assemblies are occupied with the injection molding and cooling steps, other core assemblies are occupied with the supercooling and preform ejection steps.

The number of cores per vertical row in the laterally shifting arrangement described above can be as small as one and as great as can be accommodated in the available platen 32 in FIG. 1. Likewise the number of vertical rows of cores and molds may be varied. At least two vertical rows of cores must be provided, but there can be as many vertical rows as can fit in the available platens. The number of vertical rows of injection and supercooling molds should be one greater than the number of vertical rows of core assemblies, the extra row being a vertical row of supercooling molds and the vertical rows of injection molds should alternate with the vertical rows of supercooling molds, beginning and ending with a row of supercooling molds.

The first embodiment described above includes pairs of separable neck ring halves 102 in FIG. 3 which define a neck extension of the mold cavity during the engagement of a core assembly with a mold. However, alternative neck form means may be used to accomplish the same functions. For example, if split injection molds are used the neck form means may consist of portions of the molds which extend into the area previously occupied by the neck ring halves 102. These would directly engange the sleeve of the core assembly upon engagement of the core assembly with the mold. Such inwardly projecting portions of the split injection molds and the normally split blow molds could also have grooves formed in the parison contact surfaces, and serve an identical function as the neck ring halves described in the preferred embodiment, to retain the neck portion of the associated parison during the injection cooling, supercooling and preform ejection steps, and also to form a thread on the neck of the parison.

It should be obvious that the operation of the above embodiment may be modified by changing the type of coolant which is contained in the supercoolant supply 205 in FIG. 6, and is used to supercool the preforms within the supercooling molds 26. Examples of the types of coolants which may be used are as follows: (a) ambient temperature compressed air, (b) chilled compressed air which may range in temperature from room temperature downward to as low as $-55°$ F., (c) mixing moisture with the ambient temperature or chilled compressed air, and (d) the use of industrial coolants such as liquid nitrogen or liquid carbon dioxide.

In addition, the above embodiment may be modified by using alternative support and transfer mechanisms for positioning core rods within the injection molds and supercooling molds. Any molding machine having at least two, or more, stations can perform the unique operation feature in the preferred embodiment, namely injection molding a preform and partially cooling it in one station or position, while simultaneousl supercooling the preform at a second station or position in the machine. For example, an injection molding machine with a platen to which core rods are mounted, that is rotatable about a horizontal trunion, could injection mold and partially cool preforms in a horizontal row of injection molds on the upper half of the mold platen, while simultaneously supercooling and then ejecting the preforms from a horizontal row of supercooling molds mounted on the lower half of the mold platen. Once the preforms have been injection molded and partially cooled, the press opens and separates the core rod platen from the mold platen. Then the core rod platen rotates 180 degrees and the press closes. The injection molded preforms are then supercooled while new preforms are injection molded on the empty core rods which have just rotated up to the injection molding position from the supercooling and ejection position. This cycle repeats itself continuously.

Another alternative support and transfer means would be in using the three or four station Gussoni-type injection blow molding machines. In this case, core rods are mounted to an indexing table such that preforms can be injection molded and partially cooled in a first station, simultaneously supercooled in a second station, and simultaneously ejected at a third station. The core rods index 120 degrees for each subsequent operation. In the four station Gussoni-type injection blow molding machine the preforms can be injection molded and partially cooled at a first station, simultaneously supercooled at a second station, further supercooled simultaneously at a third station, and simultaneously ejected at a fourth station. The core rods which are mounted to an indexing table, index 90 degrees for each subsequent operation.

The dimensions of the described supercooling mold cavities are fabricated such that they are greater than the dimensions of the injection mold cavity. The supercooling molds each include a center bottom passage for introducing supercoolant, and exhaust passages adjacent the open mouth for exhausting supercoolant opposite the point of introduction. It will however be appreciated by those skilled in the art that the sequence of introduction and exhaustion of supercoolant may be reversed and supercoolant introduced via the exhaust passages and exhausted via the introduced via the Thermoplastic materials suitable for use in the practice of the present invention may be selected from among polyethylene terephthalate(PET), polyvinylchloride homopolymers, polyproplyene, and copolymers thereof.

It will be understood by those skilled in the art that numerous variations and embodiments of the invention described may be made without departing from the spirit and scope of the invention. The preferred embodiments alluded to herein are for purposes of exposition only, and are not to be construed as limiting the scope of the invention as defined in the appended claims.

I claim:

1. Apparatus for the fabrication of plastic preforms suitable for use in the preparation of biaxially oriented hollow articles including (a) an injection molding machine having at least one injection mold defining an injection mold cavity having an open mouth, (b) at least two supercooling molds which define supercooling mold cavities each having an open mouth, the dimensions of said supercooling mold cavities being greater than the dimensions of the injection mold cavity, said supercooling molds each including a center bottom introduction passage for introducing supercoolant and exhaust passages adjacent said open mouth for exhausting supercoolant opposite said introduction passage, (c) at least two core assemblies, each such assembly including an elongated core rod and a sleeve surrounding such core rod in the neck area, said sleeves and core rods having respective circumferentially extensive seal surfaces, each such core rod having a parison contact portion which extends outwardly to a parison contact end or tip, (d) support and transfer means comprising conventional injection molding machine platens, press and lateral shifting mechanism for engaging each of said core assemblies alternately with an injection mold and a supercooling mold such that the sleeve of the core assembly protrudes into the cavity of said mold, said support and transfer means being constructed and arranged to simultaneously engage at least one of said core assemblies with an injection mold and at least one of said core assemblies with a supercooling mold, (e) neck-form means, operative during the engagement of each of said core assemblies with an aforesaid injection mold, for defining the neck extension of the mold cavity and for retaining the parison about the core rod, (f) injection means comprising sprues in the injection mold which allows thermoplastic, in molten form, to be injected via a conventional runner system into the cavity of each of the said injection molds while one of said core assemblies is engaged therewith, (g) core rod cooling means comprises interlaced helical channels formed around a cylindrical flow director slug within the core rod for maintaining the parison contact surfaces of said core rod at cold temperatures relative to the injection temperatures at which the thermoplastic is processed, at least while such core rod is engaged within the injection mold, and (h) injection and supercooling means for maintaining the cavity surface of each of said injection and supercooling molds at cold temperatures relative to the injection temperatures of the thermoplastic being processed.

* * * * *